United States Patent
Tang

(10) Patent No.: US 8,633,676 B2
(45) Date of Patent: Jan. 21, 2014

(54) CHARGING STATUS DISPLAY CIRCUIT AND ELECTRONIC DEVICE USING THE SAME

(75) Inventor: Xing-Hua Tang, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 573 days.

(21) Appl. No.: 12/961,464

(22) Filed: Dec. 6, 2010

(65) Prior Publication Data

US 2012/0086388 A1   Apr. 12, 2012

(30) Foreign Application Priority Data

Oct. 8, 2010   (CN) .......................... 2010 1 0500018

(51) Int. Cl.
*H02J 7/00* (2006.01)
*H02J 7/02* (2006.01)

(52) U.S. Cl.
USPC .............. 320/114; 320/113; 320/115

(58) Field of Classification Search
CPC ........................................ Y02E 60/12
USPC .......................... 320/114, 113, 115
See application file for complete search history.

(56) References Cited

U.S. PATENT DOCUMENTS 7,705,565 B2 *   4/2010   Patino et al. .................. 320/150

FOREIGN PATENT DOCUMENTS

WO   WO 2008101383 A1 *   8/2008 ............. H05B 33/08

* cited by examiner

*Primary Examiner* — Edward Tso
*Assistant Examiner* — Ahmed Omar
(74) *Attorney, Agent, or Firm* — Altis Law Group, Inc.

(57) ABSTRACT

A charging status display circuit is used in an electronic device. The electronic device includes a power supply circuit, a rechargeable battery, and an interface circuit capable of electrically connecting with the rechargeable battery. The electronic device is powered by either the power supply circuit or the rechargeable battery. The rechargeable battery is charged by the power supply circuit via the interface circuit. The charging status display unit includes a light emitting diode for indicating whether the rechargeable battery is being charged, and a surface-contact diode for clamping a voltage between the light emitting diode and the interface unit at a predetermined value. The light emitting diode is connected in series between the power supply circuit and the interface circuit. The surface-contact diode is connected in parallel with the light emitting diode.

17 Claims, 2 Drawing Sheets

CHARGING STATUS DISPLAY CIRCUIT AND ELECTRONIC DEVICE USING THE SAME

BACKGROUND

1. Technical Field

The present disclosure relates to electronic devices, and particularly to an electronic device using a charging status display circuit for indicating a charging state of the device.

2. Description of Related Art

In many rechargeable electronic devices, a light emitting diode (LED) is used to indicate charging status of the device. Because the LED may be permanently damaged when subjected to high voltages generated by electrostatic discharge (ESD), the LED is usually protected by an electrostatic protector.

However, because the electrostatic protector is often electrically grounded, static electricity accumulated on the electronic device may form a current which through flows the electrostatic protector. If the current is too great, the LED may suffer reverse breakdown and be damaged.

Therefore, there is room for improvement in the art.

BRIEF DESCRIPTION OF THE DRAWINGS

The components of the drawings are not necessarily drawn to scale, the emphasis instead being placed upon clearly illustrating the principles of the embodiment of an electronic device with a charging status display circuit. Moreover, in the drawings, like reference numerals designate corresponding parts throughout the views.

DETAILED DESCRIPTION

Embodiments of the present disclosure will now be described in detail with reference to the drawings.

Figure 1:
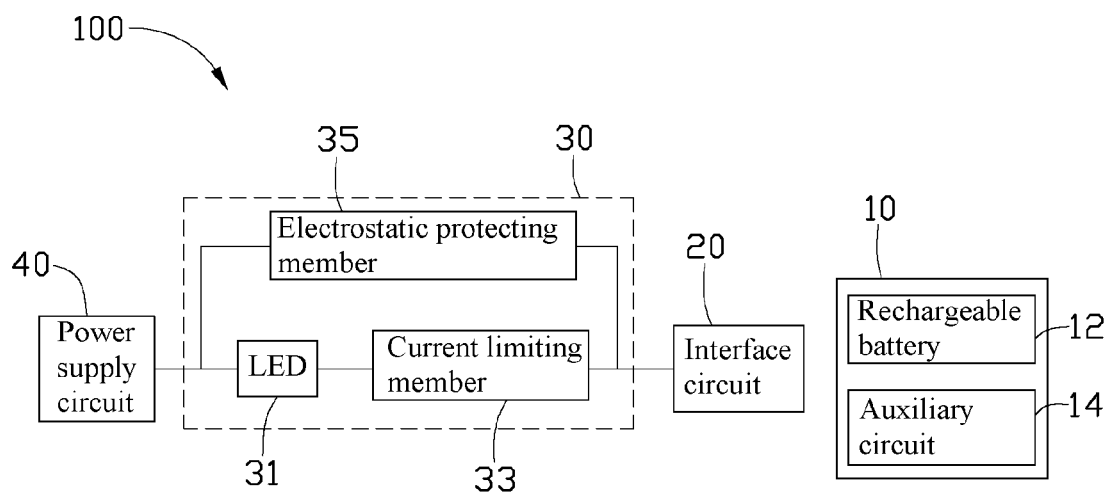
FIG. 1 is a functional block diagram of an electronic device according to an exemplary embodiment.

Referring to FIG. 1, an electronic device 100 according to an exemplary embodiment is illustrated. In this embodiment, the electronic device 100 is a DVD player. The electronic device 100 includes a battery unit 10, an interface circuit 20, a charging status display circuit 30, and a power supply circuit 40.

The battery unit 10 is detachably mounted to the electronic device 100, and is used for powering the electronic device 100. The battery unit 10 includes a rechargeable battery 12 and an auxiliary circuit 14 used with the rechargeable battery 12.

The power supply circuit 40 is used for receiving an external electrical power (not shown) to power the electronic device 100. Thus, the electronic device 100 can be selectively powered by either the battery unit 10 or the power supply circuit 40. When the electronic device 100 is powered by the power supply circuit 40, the battery unit 10 can be charged in the meantime by the power supply circuit 40.

The interface circuit 20 is set on the electronic device 100 and is exposed to the outside of the electronic device 100. The interface circuit 20 is used for electrically connecting to the battery unit 10. When the battery unit 10 is electrically connected to the interface circuit 20, the electronic device 100 can be powered by the battery unit 10 and the rechargeable battery 12 can be charged by the external power via the power supply circuit 40. In this embodiment, the interface circuit 20 is a connector exposed to outside.

The charging status display circuit 30 is electrically connected between the power supply circuit 40 and the interface circuit 20. The charging status display circuit 30 includes a light emitting diode (LED) 31, a current limiting member 33, and an electrostatic protecting member 35. The LED 31 is connected in series with the current limiting member 33. The LED and the current limiting member 33 are connected in parallel with the electrostatic protecting member 35.

The LED 31 is used for indicating whether the rechargeable battery 12 is currently being charged. When the rechargeable battery 12 is being charged, the LED 31 is powered by the power supply circuit 40 to emit light. When the rechargeable battery 12 is not being charged, for example, the battery unit 10 has been detached from the interface circuit 20 or the rechargeable battery 12 is fully charged, the LED 31 is turned off.

The current limiting member 33 is used for limiting any current through the LED 31 to a safe value. The electrostatic protecting member 35 is used for clamping a voltage between the current limiting member 33 and the interface unit 20 at a predetermined value. The predetermined value is set to be lower than a threshold value above which the LED 31 is likely to be damaged. Thus, the LED 31 is protected from reverse breakdown caused by ESD.

Figure 2:
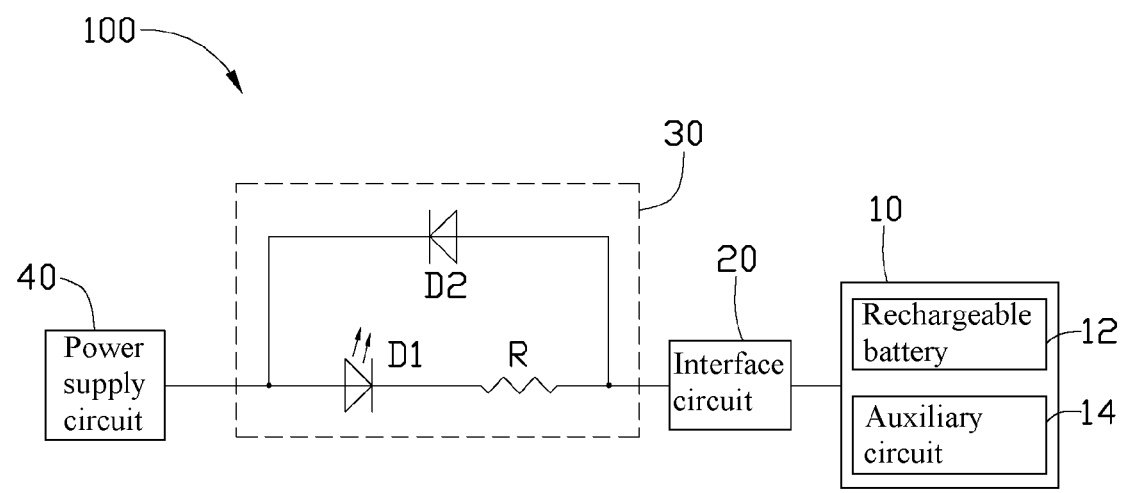
FIG. 2 is a partial circuit diagram of the electronic device of FIG. 1.

Further referring to FIG. 2, the LED 31 is labeled as D1. In this embodiment, the current limiting member 33 is a resistor R, the electrostatic protecting member 35 is a surface-contact diode D2. An anode of the LED D1 is electrically connected to the power supply circuit 40, and a cathode of the LED D1 is electrically connected to one end of the resistor R. The other end of the resistor R is electrically connected to the interface circuit 20. An anode of the surface-contact diode D2 is electrically connected between the interface circuit 20 and the resistor R, and the cathode of the surface-contact diode D2 is electrically connected to the anode of the LED D1.

When the electronic device 100 is powered by the power supply circuit 40, and the battery unit 10 is electrically connected to the interface unit 20, and the rechargeable battery 12 is not fully charged, the LED D1 is turned on and the battery 12 will received a charging current. The surface-contact diode D2 is turned off. When the rechargeable battery 12 is fully charged, voltages at ends of the LED D1 are substantially the same, thus, the LED D1 is turned off, and the surface-contact diode D2 is also turned off.

With the interface circuit 20 exposed to air, static electricity easily accumulates on the interface circuit 20. Thus, when the interface circuit 20 is electrically connected to the battery unit 10, a high voltage (e.g., 10 KV) may be momentarily generated. The surface-contact diode D2 is turned on accordingly, and electrostatic current flows from the diode D2 to the power supply circuit 40. Thus, the electrostatic current can be quickly dissipated to ground, and the LED D1 is protected from reverse breakdown caused by ESD.

As discussed above, the electronic device 100 has an effective electrostatic protection function to protect the LED D1 from damage caused by ESD.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation to encompass all such modifications and similar arrangements.

What is claimed is:

1. A charging status display circuit used in an electronic device, the electronic device comprising a power supply circuit, a rechargeable battery, and an interface circuit capable of electrically connecting with the rechargeable battery, the electronic device powered by either the power supply circuit or the rechargeable battery, the rechargeable battery charged by the power supply circuit via the interface circuit, the charging status display circuit connected between the power supply circuit and the interface circuit comprising:
- a light emitting diode for indicating whether the rechargeable battery is being charged, the light emitting diode connected between the power supply circuit and the interface circuit; and
- a surface-contact diode for clamping a voltage between the light emitting diode and the interface unit at a predetermined value when the rechargeable battery connects with the interface circuit, the surface-contact diode and the light emitting diode connected in parallel between the power supply circuit and the interface circuit.

2. The charging status display circuit of claim 1, wherein an anode of the light emitting diode is electrically connected to the power supply circuit, and a cathode of the light emitting diode is electrically connected to the interface circuit.

3. The charging status display circuit of claim 2, wherein an anode of the surface-contact diode is electrically connected to the cathode of the light emitting diode, and a cathode of the light emitting diode is electrically connected to the anode of the light emitting diode.

4. The charging status display circuit of claim 1, further comprising a current limiting member for limiting a current occurred on the light emitting diode to a safe value.

5. The charging status display circuit of claim 4, wherein the current limiting member is connected between the light emitting diode and the interface circuit.

6. The charging status display circuit of claim 4, wherein the current limiting member comprises a resistor.

7. An electronic device, comprising:
- an interface circuit;
- a rechargeable battery for powering the electronic device, the rechargeable battery capable of connecting with the interface circuit;
- a power supply circuit for powering the electronic device, and further for charging the rechargeable battery via the interface circuit; and
- a charging status display circuit connected between the power supply circuit and the interface circuit comprising:
- a light emitting diode for indicating whether the rechargeable battery is being charged, the light emitting diode connected between the power supply circuit and the interface circuit; and
- a surface-contact diode for clamping a voltage between the light emitting diode and the interface unit at a predetermined value when the rechargeable battery connects with the interface circuit, the surface-contact diode and the light emitting diode connected in parallel between the power supply circuit and the interface circuit.

8. The electronic device of claim 7, wherein an anode of the light emitting diode is electrically connected to the power supply circuit, and a cathode of the light emitting diode is electrically connected to the interface circuit.

9. The electronic device of claim 8, wherein an anode of the surface-contact diode is electrically connected to the cathode of the light emitting diode, and a cathode of the light emitting diode is electrically connected to the anode of the light emitting diode.

10. The electronic device of claim 7, further comprising a current limiting member for limiting a current occurred on the light emitting diode to a safe value.

11. The electronic device of claim 10, wherein the current limiting member is connected between the light emitting diode and the interface circuit.

12. The electronic device of claim 10, wherein the current limiting member comprises a resistor.

13. The electronic device of claim 10, wherein the interface circuit is exposed to the outside of the electronic device.

14. An electronic device, comprising:
- an interface circuit;
- a rechargeable battery capable of connecting with the interface circuit;
- a power supply circuit; and
- a charging status display circuit connected between the power supply circuit and the interface circuit, comprising:
- a light emitting diode, an anode of the light emitting diode electrically connected to the power supply circuit, and a cathode of the light emitting diode electrically connected to the interface circuit; and
- a surface-contact diode for clamping a voltage between the light emitting diode and the interface unit at a predetermined value when the rechargeable battery connects with the interface circuit, an anode of the surface-contact diode electrically connected to the cathode of the light emitting diode, and a cathode of the light emitting diode electrically connected to the anode of the light emitting diode.

15. The electronic device of claim 14, further comprising a current limiting member connected between the light emitting diode and the interface circuit.

16. The electronic device of claim 15, wherein the current limiting member comprises a resistor.

17. The electronic device of claim 14, wherein the interface circuit is exposed to the outside of the electronic device.

* * * * *